Patented Apr. 16, 1940

2,197,357

UNITED STATES PATENT OFFICE 2,197,357

CONDENSATION PRODUCTS OF AMINO-TRIAZINE, ALDEHYDE, AND ALCOHOLIC GROUP-CONTAINING COMPOUNDS AND PROCESSES OF MAKING SAME

Gustave Widmer, Basel, and Willi Fisch, Muttenz, near Basel, Switzerland, assignors, by mesne assignments, to Ciba Products Corporation, Dover, Del., a corporation of Delaware No Drawing. Application October 14, 1937, Serial No. 169,068. In Switzerland September 28, 1935

22 Claims. (Cl. 260—72)

This invention is concerned with aldehyde condensation products of triazines of the formula

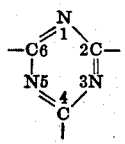

wherein at least one of the free valencies is substituted by an amine group. It comprises the process of manufacture thereof and the new products themselves, as well as their application in the industry.

This application is a continuation in part of our copending application Ser. No. 68,355 filed March 11, 1936.

As typical examples of amino-triazines there may be mentioned the 2:4:6-triamino-1:3:5-triazine [C₃N₃(NH₂)₃] of the formula

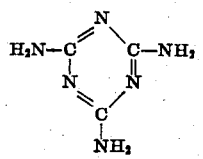

which is commonly called melamine, 2:4-diamino-1:3:5-triazine (formoguanamine) (Formula I), 2-amino-1:3:5-triazine (Formula II)

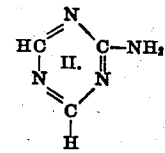

further melam (Formula III), melem (Formula IV), melon (Formula V) which products may be considered as derived from melamine by partial desamidation

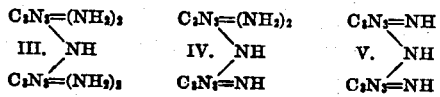

[cf. Journ. Am. Chem. Soc., 44, I, 486 (1922)], or the products wherein one or two amino groups are substituted by hydroxy, halogen, alkyl, aryl or aralkyl groups, such as for instance 2-hydroxy-4:6-diamino-1:3:5-triazine (ammeline) (Formula VI), 2:-hydroxy-6-amino-1:3:5-triazine (ammelide) (Formula VII)

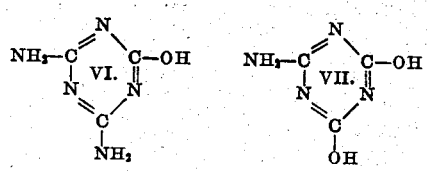

2-chloro-4:6-diamino-1:3:5-triazine (Formula VIII), 2-phenyl-p-oxy-4:6-diamino-1:3:5-triazine (Formula IX), 2-phenyl-4-amino-6-hydroxy-1:3:5-triazine (Formula X)

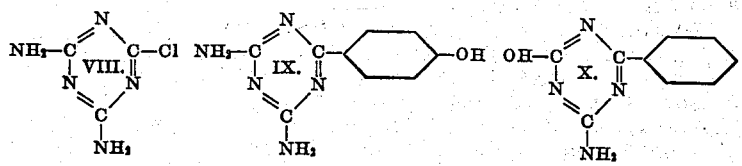

6-methyl-2:4-diamino-1:3:5-triazine (acetoguanamine) (Formula XI). Moreover, also such amino-triazines may be used wherein the hydrogen atoms of the amino groups are partially substituted by amino, alkyl, aryl or aralkyl groups, such as 2:4:6-trihydrazino-1:3:5-triazine (Formula XII)

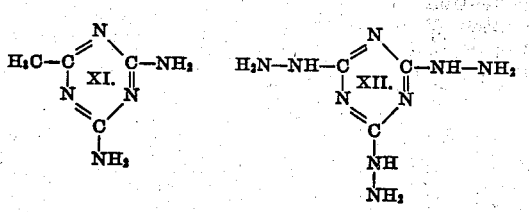

mono-di- or trialkyl-melamines, for instance 2:4:6-triethyl-triamino-1:3:5-triazine (Formula XIII), mono-di- or triaralkyl- or mono-di- or triaryl-melamines, for instance 2:4:6-triphenyl-triamino-1:3:5-triazine (Formula XIV)

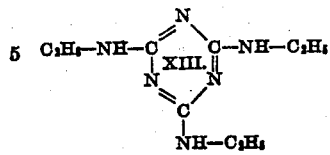
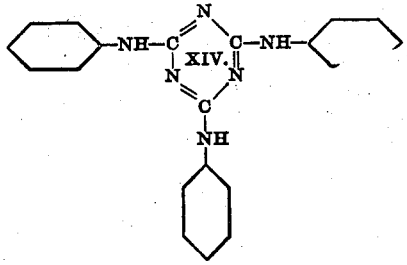

known manner by adding inorganic or organic acids or bases or salts thereof.

As is known, the triazines are conceivable also in an isoform of the following formula:

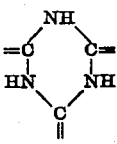

Of course in the case of this isoform also the hydrogen atoms of the cyclic imino groups may be substituted.

As aldehydes there may be used aliphatic aldehydes, such as for instance formaldehyde, acetaldehyde, crotonic aldehyde, acrolein, further aromatic or heterocyclic aldehydes, such as benzaldehyde, furfural and the like.

The term aldehydes includes not only the aldehydes themselves, but also compounds yielding aldehydes, for instance paraformaldehyde, trioxymethylene, paraldehyde, and the like.

The following description relates, in particular, to the production of formaldehyde condensation products from 2:4:6-triamino-1:3:5-triazine (melamine); however, the description applies with obvious modifications to other aminotriazines or their derivatives.

Melamine reacts surprisingly freely with neutral aqueous solutions of formaldehyde and in all molecular proportions of melamine to formaldehyde. In the cold, there are formed, by prolonged action, the methylol compounds which at suitable concentration may separate from the solution in crystalline form. At higher temperatures the methylol compounds are formed in a shorter time, for example boiling for some minutes and cooling to separate the compound. By the further action of heat, further condensation occurs with rapid formation of hydrophilic and then hydrophobic resins, the latter separating as a layer on cooling, or even while hot if the reaction is prolonged. By still further heating, there is finally formed a gummy phase, followed by hardening to an insoluble polymerization product. Correspondingly with the desired condensation product, the reaction may be interrupted at any phase of the condensation and the product separated in known manner by filtration, evaporation, precipitation, decantation, drying or the like. In this manner the whole series of the reaction products of the methylol compounds may find practical application in many directions as hydrophilic and hydrophobic resins.

The hydrogen ion concentration has a very great influence on the speed of the reaction. In the case of neutral or feebly alkaline reaction the condensation proceeds in general very gradually. In the case of feebly acid reaction the speed of condensation is strongly accelerated; also strong alkaline reaction accelerates the condensation.

The desired pH-value may be obtained in known manner by adding inorganic or organic acids or bases or salts thereof.

The condensation may be conducted to produce easily clear, hydrophilic or hydrophobic condensation products with all reasonable molecular ratios of melamine to formaldehyde, for example 1:1 up to 1:20. The hydrophobic properties of the condensation products are liable to be influenced profoundly by the pH value. The separated hydrophobe resins which are not yet polymerized to a very high degree have the outstanding property of dissolving to clear solutions in acid. By addition of alkali they are again precipitated and by further addition of acid pass again into solution. These properties are not only those of the resinous condensation products from melamine but are also possessed by the melamine-methylol compounds, and they can be utilized for various purposes, for instance for the precipitation of the condensation products on fibers.

For the manufacture of commercial condensation products it is frequently not necessary to use so much formaldehyde for the reaction as may be the maximum that can be condensed, since the condensation products obtainable with a smaller proportion of formaldehyde have also good commercial properties.

The condensation may be conducted in several stages by first using either melamine or formaldehyde in excess and then causing the mixture to react in one or more stages with the component which was originally in deficiency. For example, 1 mol melamine may be caused to react with ½ mol. formaldehyde and the product treated with a further quantity of formaldehyde. However, one may also produce condensation products having much formaldehyde and then bring them into reaction with further quantities of melamine.

The reaction between melamine and formaldehyde may occur in an organic medium instead of in water, in which case there are obtained directly solutions of the respective condensation products in organic solvents, which are applicable for the manufacture of lacquers or as additions to lacquers, for example nitrocellulose lacquer. Suitable organic solvents are, for instance ethyl alcohol, butyl alcohol, acetone, glycerine, benzyl alcohol, or the glycerides of the fatty acids of linseed oil. The condensation may also be produced in mixtures of water and organic solvents, for instance in aqueous alcohol of 50 per cent. strength.

Melamine and formaldehyde may also be condensed with exclusion of solvent, for example with the use of paraformaldehyde.

The application of solvents is advantageous when the reaction is performed in a closed vessel (autoclave), when it is possible to select a reaction temperature above the boiling point of the solvent, for instance ethyl alcohol.

The formaldehyde condensation products of melamine obtained by the reaction described have very good capacity for being hardened by heat, that is to say they are infusible and insoluble under the influence of heat. Furthermore, they are stable to light and free from intrinsic color. They are, therefore, suitable for very many purposes, for instance as masses to be cast or pressed in the industry of plastic masses, as binding agents for the production of molded or laminated products; also for adhesives, especially in the wood-working industry; in the textile industry for dressing, anti-creasing, matting and the like; as lacquer binding agents or additions to lacquers. In many of these applications, particularly in that of molded masses and laminated products, the surprising stability to heat displayed by the condensation products in the heat-hardening is of great advantage, since the operation is not limited to a narrow range of temperature but extends over a considerable temperature interval. The melamine resins are in this respect similar to the phenol-resins. The formaldehyde condensation products of melamine in their hardened condition are surprisingly quite stable to water.

Other aminotriazines or their derivatives may be converted into their corresponding condensation products with formaldehyde in manner similar to that outlined above in the case of melamine.

It is not necessary to use aminotriazine alone in the condensation; they may be mixed with other compounds capable of forming resins with aldehydes, for instance phenols, urea, thiourea, cyanamide, dicyandiamide, sulfonamides, aniline or the like or a mixture of any of these, the products being mixed condensation products. In this case also condensation may be carried out in several stages, for example the second component may be added to a primary condensation product made with a sufficient proportion or an excess of formaldehyde. It also is possible to mix or condense further the amino-triazine condensation product with another natural or artificial resin, for instance phenol-formaldehyde, or the condensation products from urea or thiourea and formaldehyde. At any stage of the condensation other substances may be added, for instance dyestuffs, filling materials, plasticizers, water-repelling agents or the like.

It has further been found that when the reaction between the aminotriazine and the aldehyde is performed in presence of an organic medium, this latter may in some cases take part in the reaction. This is especially the case when the condensation is performed in presence of compounds containing alcoholic hydroxy groups. These compounds do not only act as solvents, plastifiants or the like but also constitutively enter into the reaction product forming new compounds the properties of which more or less differ from those of the corresponding compounds made only from aminotriazine and aldehyde viz. in the absence of compounds containing alcoholic hydroxy groups.

The following description refers especially to these products made from at least three components viz. an aminotriazine, an aldehyde and a compound containing an alcoholic hydroxy group.

The general conditions of manufacture are analogous to those described above for the production of condensation products of aminotriazines with aldehydes.

However, the following may be said especially in respect of the condensation products made with the concurrence of compounds containing alcoholic hydroxy groups.

The aminotriazines coming into question for this reaction are substantially the same as are enumerated above. As further examples there may be mentioned: 2-amino-4-hydroxy-6-chloro-1:3:5-triazine (I), 2-amino-4-hydroxy-6-phenyl-1:3:5-triazine (II), 2-methylamino-4-amino-6-chloro-1:3:5-triazine (III), 2:4-diamino-6-phenylamino-1:3:5-triazine (IV), 2-amino-4:6-diphenylamino-1:3:5-triazine (V), 2:4:6-trimethylamino-1:3:5-triazine (VI) and so on:

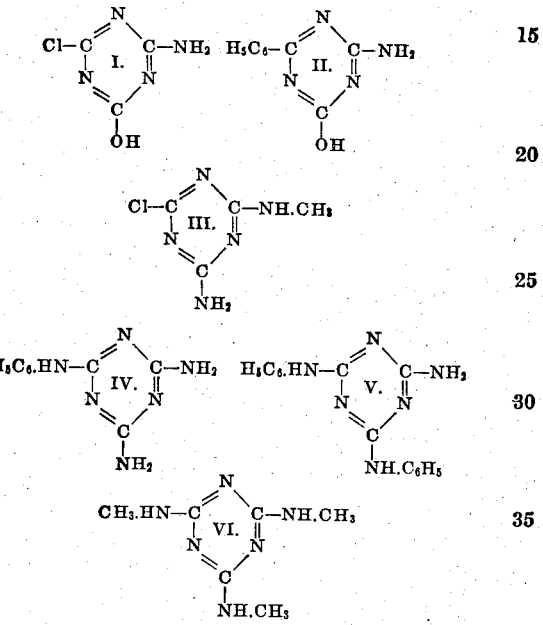

Also amino derivatives of other triazines, for instance 1:2:4-triazines may be used, such as for example 3-amino-1:2:4-phentriazine (VII), 3-amino-1:2:4-phentriazoxin (VIII) of the formula

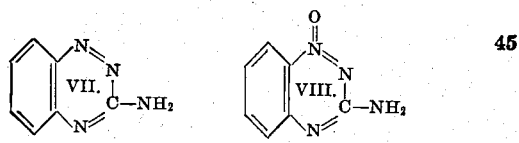

or the like.

As aminotriazines there may thus be used generally those derived from the formula

wherein two A's mean —N= and the other two mean

and wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

The aldehydes coming into question are the same as cited above.

Compounds containing alcoholic hydroxy groups suitable as components for the new condensation products include mono- or polyhydric alcohols having aliphatic, aromatic, hydroaromatic or heterocyclic radicals. Also compounds which besides the alcoholic hydroxy groups contain further reactive substituents, for instance aldehyde-, keto-, carboxyl-, halogen- or amino-groups, which groups may in their turn contain substituents.

Among the individual mono- and polyhydric alcohols may be named the following: methyl alcohol, ethyl alcohol, butyl alcohol, ethyl butanol, ethyl hexanol, lauryl alcohol, cetyl alcohol, stearyl alcohol, allyl alcohol, oleyl alcohol, glycol, glycerol, mannitol, sorbitol, benzyl alcohol, terpineol, borneol, abietinol, wool fat alcohols, furfuryl alcohol or the like.

Among mono- and polyhydric alcohols containing further substituents there may be named keto- and aldehyde alcohols like aldol, glycol aldehyde, glycerol aldehyde; the groups of the carbohydrates, for example glucose, cane sugar, trihexosane or their polymerides, such as dextrine, starches, gum arabic, tragacanth or the like; oxycarboxylic acids, such as tartaric acid, malic acid, ricinoleic acid, saccharic acid or their esters or the like; halogen alkyl alcohols, for instance chlorethyl alcohol, glycol chlorhydrin, glycerol chlorhydrin, chloralhydrate; amino-alcohols, for instance mono-, di- and triethanolamine or the like.

Among the polyhydric alcohols those are of importance in which some of the oxy-groups have been etherified or esterified. Among these are glycolmonoethyl ether, glycolacetate, glycerolmono- and diethyl ether, for instance diethyline, also cyclohexanone glycerol ($O^a$, $O^\beta$-cyclohexylidene-glycerol), glycerolmono- or di-esters, for example those of saturated or unsaturated fatty acids. Also ester resins having free hydroxyl groups of the type of the alkyd resins may be used, for example the esters of glycerolphthalic acid ester, glycerol adipic acid ester or glycerol sebasic acid ester which still contain free hydroxyl groups.

Instead of the compounds containing alcoholic hydroxy groups themselves compounds may be used which are converted under the conditions of the reaction into others containing alcoholic hydroxyl groups, for example acetals, esters.

Particularly advantageous for the invention are those of the above mentioned groups which are of the type of the carbohydrates and because of their easy accessibility in nature.

The bodies which are to react may be brought together simultaneously or in any order of succession. In any case the several components may be added in stages. Obviously mixtures of the individual components may be used.

The proportions in which the components react may be varied within wide limits.

Also other condensation conditions, such as temperature, solvent or diluent, substances accelerating the reaction, for instance acids, substances that yield acid, bases or the like are subject to wide variations.

Water and organic solvents may be used as solvents; also an excess of the compound containing alcoholic hydroxy groups and serving as the condensation component may be used as the solvent.

The reaction may occur in a closed vessel (autoclave), in which case the temperature of the reaction may be above the boiling point of one or other of the components or the solvent.

The reaction may occur also in absence of a solvent or diluent.

The properties of the new condensation products vary according to the parent material selected as well as the conditions of the reaction. Thus it is possible to produce products which are characterized by lack of color as well as excellent stability to light and heat and of resistance to chemical action. Their solubility may be varied within wide limits. Products may be obtained which are soluble in water, others which are soluble in organic solvents and yet others which are insoluble in all the usual solvents. The products have for the most part a resinous nature and may belong both to the type of resin which can be hardened and that which cannot be hardened. In the case of those which are capable of being hardened this conversion may be effected by known methods, for example by heating or catalytic action. The products which cannot be hardened may be converted into those which can be hardened by, for instance, the addition of a further proportion of aldehyde, particularly formaldehyde or an agent yielding aldehyde.

In view of the many variations in the properties of the new products, their applications are numerous.

The rapidly hardening products either alone or in admixture wtih plasticising agents or filling agents like fibrous materials yield molding powders which can be shaped in a hot press. The molded articles are of good stability to water and heat and have good mechanical properties.

The new products are suitable quite generally as binding agents, for instance for glueing wood, paper, textile fabrics, for the production of artificial wood from fibrous material, artificial cork, brush cements, for fixing coloring materials, also for the production of insecticides and the like on any kind of support.

The products may also be used for impregnating textile webs and then for binding these to form homogeneous laminated bodies by means of the hot press.

A further extensive use for the new materials is in the lacquer industry. The products may be used alone as lacquers. They may also be added to lacquers in order thereby to make these harder or more stable to water. They are also important as additions to air drying oils, for the purpose of making varnishes.

The new products may also be used for making shaped bodies by a casting process; in this case there may be obtained bodies clear as glass and resistant to water as well as of good mechanical strength.

In textile chemistry the new substances find a wide application, for instance as finishes, as non-creasing agents, for diminishing a capacity for swelling, as thickening or stiffening agents or as softening agents, as agents for making fillers or finishes fast to water, in the preparation of dyed or printed material.

The properties of the products may be further modified if the reaction components, viz., aminotriazines, bodies containing alcoholic hydroxy groups and aldehydes are used with the simultaneous or subsequent addition of further bodies which are capable of reacting with an amino-group, an alcoholic hydroxy group or an aldehyde group. As such additions may be named, for example, amines, amides, for instance aniline, urea, thiourea, sulfamide, phenols, acid chlorides or the like. Such an addition is advantageous, for example, when one of the three primary components is used in excess. In this case mixtures of various condensation products are produced.

When aminotriazines, aldehydes and compounds containing alcoholic hydroxy groups are used which contain besides their amino group or groups, alcoholic hydroxy group or groups and/or aldehyde group or groups respectively still further reactive groups, for instance halogen, carboxyl, carbonyl, hydroxyl or amino groups, it is possible to cause these groups to enter wholly or in part into reaction with further reactive bodies such as acid chlorides or anhydrides, alcoholates, salts of carboxylic acids, amines or amides. For this reaction substances are also applicable which are on their own account capable of entering into reaction simultaneously or subsequently with further reactive bodies.

It is also possible to mix the new condensation products with artificial or natural resins or to condense them therewith. Also at any stage of the condensation further substances, for instance dyestuffs, fillers, softeners, dehydrating agents or water-proofing agents may be added.

The following examples illustrate the invention, the parts being by weight unless otherwise stated and the parts by volume and the parts by weight bearing the relationship to one another as that of the litre to the kilo:

Example 1

A mixture of 12.6 parts (0.1 mol.) of melamine of the formula

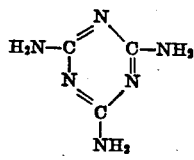

and 75 parts by volume (0.8 mol.) of neutral formaldehyde solution of 32 per cent. strength by volume are heated together in the boiling water-bath until dissolved and the heating is continued for 10 minutes. On cooling flocks separate. After 2 days the crystalline magma is filtered, thoroughly washed with alcohol and dried for 5 hours at 60° C.

The product is a powder of crystalline appearance under the microscope.

Its analysis indicates the formula:

| $C_3H_6N_6.6CH_2O.H_2O$ | C | H | N |
|---|---|---|---|
| Calculated | 33.2 | 6.2 | 25.9 |
| Obtained | 33.2 | 6.2 | 26.5 |

It melts at about 150° C. to a clear liquid which by further heating passes into a glassy, hard product insoluble in water.

In quite analogous manner there may be produced instead of the hexamethylol-compound other methylol compounds by using a smaller proportion of formaldehyde. These methylol compounds are soluble in hot water and crystallize again on cooling. On addition of acid solutions are obtained which remain clear when cold and are suitable, in particular, as impregnating agents, for instance for textiles.

Example 2

126 parts of melamine (1 mol.) are dissolved in 424 parts by volume of neutral formaldehyde of 31.8 per cent. strength by volume (4½ mol.) by heating in a boiling water-bath under reflux. After heating for 30 minutes, a small sample in a test tube will yield a precipitate of resin when diluted with much water. After 40 minutes a sample will yield a precipitate of resin when diluted with an equal volume of water. At this stage the solution is cooled. 235 parts of this melamine formaldehyde condensation product are kneaded together with 50 parts of cellulose and the mass is dried in the drying chest for 2 hours at 70–80° C. The product is then ground with 0.5 part of zinc stearate and molded into the form of a small plate at 145° C. and under a pressure of about 150 kilogrammes per sq. cm. This molded plate, with 3, 1½ and 1 minutes pressing, becomes very hard and lustrous and shows the following absorption of water:

| Duration of pressing at 145° C. minutes | 3 | 1½ | 1 |
|---|---|---|---|
| Water absorption after 24 hours immersion in water at room temperature per cent | 0.9 | 0.26 | 0.34 |
| After 10 minutes boiling in water do | 0.34 | 1.0 | 1.6 |

Example 3

The directions of Example 2 are followed with half the proportion of formaldehyde named, that is to say with 2¼ mol. formaldehyde per 1 mol. melamine; a wholly similar molding powder is obtained. The pressing properties, as well as the properties of the molded piece obtained, are very similar to those described in Example 2.

Example 4

A condensation solution is produced from 3 mols. aqueous neutral formaldehyde and 1 mol. melamine in the manner described in Example 2 and yields a precipitate of resin when a sample is diluted with twice its volume of water. 200 parts of this solution are kneaded with 40 parts of cellulose, the mixture is dried in a current of air 70–80° C. and ground with 0.4 part of zinc stearate. The following table shows the remarkable intensitivity to heat of the molding powder even when using extreme hardening temperatures, the time of hardening in each case being 2 minutes:

| Molding temperature | 145° C. | 190° C. |
|---|---|---|
| Flow and hardness when ejected | Very good | Very good. |
| Water absorption: | | |
| (a) 10 minutes boiling in water | 0.3% | 0.5%. |
| (b) 10 minutes boiling in a solution of citric acid of 1% strength | 0.2% | 0.15%. |
| (c) After immersion in cold water for 24 hours | 0.23% | 1.7%. |
| After 14 days storage in water | Pieces hard and unchanged. Pieces unchanged. | |

The products are remarkably insensitive not only to variations of the molding temperature but also to the duration of the molding, as is shown in the following table, the temperature of molding being in each case 170–175° C.:

| Duration of molding | Water absorption of the product | |
|---|---|---|
| | 10 minutes in boiling water | 24 hours in water at ordinary temperature |
| | Percent | Percent |
| ¼ minute | 0.1 | 0.1 |
| ½ minute | 0.1 | 0.1 |
| 1 minute | 0.1 | 0.15 |
| 3 minutes | 0.1 | 0.5 |

All the molded articles are very hard when hot ejected. Notwithstanding a twelvefold variation in the duration of molding they have all the same light color.

Instead of drying the impregnated cellulose in a current of air in the drying chest as prescribed in Examples 2, 3 and 4, the material is dried in a drying drum or a vacuum chest. It is also possible, as is usual in the case of phenol resins, to dry the mass on the mixing rollers, preferably after a part of the water has been separated by evaporating the condensation solution before the impregnation of the cellulose. In this manner a coherent skin is formed very rapidly which normally diminishes and after coarse comminution the product flows well under pressure in the mold.

*Example 5*

The melamine resin solution obtained as described in Example 2 is used for impregnating unsized α-paper (A) and unsized α-paper containing lithopone (B). The paper webs, dried in the air, are now piled and the pile is pressed for 10 minutes between polished metal plates at 145° C. under a pressure of about 150 kilos per sq. cm. The product is of homogeneous lamination and is very stable, even when very hot. If these plates are kept at 130° C., for example for 16 hours, their color remains quite unchanged. These laminated products have remarkably low capacity for absorbing water and both after boiling in water or immersion for 1 day in cold water remain perfectly unchanged.

*Example 6*

1000 parts of finely ground melamine (8 mols.) and 2280 parts by volume of commercial formaldehyde (pH=3) of 31.5 per cent. strength (24 mols.) are vigorously stirred together on a water bath having a temperature of 75° C. After 15 minutes the reaction mixture has also attained a temperature of 75° C. After a further 5 minutes a sample yields a precipitation of resin when diluted with much water. The reaction solution is at once cooled. There is obtained a clear solution now having a pH value of 7.

The condensation solution is dried on trays in a vacuum chest for 16 hours at 65° C. There is obtained a foamy, dry product which after comminution can be molded in a hot press to produce molded articles which are clear as glass and are very resistant to water, as is shown by the following figures:

|  | Absorption of water | | |
| --- | --- | --- | --- |
|  | Molded for 1 minute at 175° C. | Molded for 2 minutes at 145° C. | Molded for 3 minutes at 145° C. |
| 24 hours in water at room temperature | Percent 0.1 | Percent 0.1 | Percent 0.2 |
| 10 minutes in boiling water | 0.1 | 0.2 | 0.15 |
| 2½ hours in boiling water | | | 0.7 |

*Example 7*

The condensation solution prepared as described in Example 6 is rendered weakly alkaline to phenolphthalein by the addition of an alkaline agent, such as caustic soda solution, and then dried just as described in Example 6. There is obtained in this case a dry product which easily redissolves in cold water. The solutions can be used for coating or impregnation, which may be followed, if required, by hot pressing.

*Example 8*

126 parts of melamine (1 mol.), 360 parts by volume of alcoholic formaldehyde solution of 41.8 per cent. strength (5 mol.) 300 parts by volume of alcohol and 1 part by volume of concentrated hydrochloric acid (0.01 mol.) are heated together under reflux to boiling. After about 15 minutes the whole is dissolved. After 45 minutes, the clear solution is cooled. If a sample thereof is diluted with water a resin separates immediately. A sample poured upon glass and hardened at 150° C. yields a hard, clear film.

*Example 9*

50 parts of a methylol-compound of melamine, obtained as described in Example 1, are added to 80 parts by volume of butyl alcohol and 0.5 part by volume of concentrated hydrochloric acid and the mixture is heated to boiling for ¼ hour. A quite clear solution is obtained which dries and hardens quickly to a hard varnish when heated to a thin layer. Such solutions in butyl alcohol may be added, for example, to nitrocellulose lacquers in order to lend them hardness and filling capacity.

*Example 10*

126 parts of melamine (1 mol.) are condensed with 280 parts by volume of neutral formaldehyde solution of 32 per cent. strength by volume (3 mol.) in a reflux apparatus on an open flame by boiling for 30 minutes and the solution obtained is evaporated in a vacuum at about 60° C. to produce a thick syrup. The latter, preferably after addition of a softening agent, for example glycerine, is poured into molds and hardened by gradually increasing the temperature.

The cast masses have an appearance as bright as water and clear as crystal and are of good hardness and stability to water.

*Example 11*

63 parts of melamine (½ mol.) and 120 parts of urea (2 mol.) are dissolved in 435 parts by volume of neutral formaldehyde of 31 per cent. strength by volume (4.5 mol.) in the boiling water bath and allowed to react for half-an-hour. A sample removed and cooled yields a precipitate of resin. The whole solution is now kneaded with 120 parts of cellulose and the mass is dried and ground. The molding powder thus obtained flows well in the mold when heated for 3 minutes at 145° C. It yields good pressed products of the carbamide-resin type. Instead of urea a mixture of urea and thiourea or thiourea alone may be used.

*Example 12*

A mixture of 50 parts of melamine (0.4 mol.), 37.3 parts of phenol (0.4 mol.) and 119 parts by volume of formaldehyde of 40.3 per cent. strength by volume (1.6 mol.) is caused to react in feebly acid solution at about 95° C. for half-an-hour. The solution then forms two layers; the whole of the condensation product is kneaded with 60 parts of cellulose and the mass is ground and dried. The molding powder thus obtained flows well and is capable of being molded in known manner in the hot press.

*Example 13*

In order to indicate the considerable effect of the hydrogen ion concentration on the speed of the formation of resin the following series of experiments may be cited:

¼ mol. melamine was dissolved by boiling aqueous neutral formaldehyde solution of 31 per cent.

strength by volume (¾ mol.) and the reaction allowed to proceed for 20 minutes under reflux. The whole was then cooled. The stock solution of the melamine condensation product thus obtained can be diluted with water while remaining clear. Portions of 5 cc. each of this solution were mixed with the catalytic addition to be tested and were further condensed in a boiling water-bath under observation.

|   | Addition | Reaction | pH-value | Condensation phenomena or behavior of the condensation solution |
|---|---|---|---|---|
| 1 | 1 cc. NaOH N/1 | Phenolphthalein, strong red. | 12.5 | After 3 minutes' cooling, turbid; after 6 minutes' heating, turbid; after 15 minutes' heating, liquid resin separated. |
| 2 | 0.05 cc. NaOH N/1 | Phenolphthalein, red | 11.0 | After 60 minutes' cooling, turbid; after 140 minutes' heating, turbid |
| 3 | Original solution | Litmus blue thiazole, colorless. | 7.5 | After 45 minutes' cooling, turbid; after 90 minutes heating, turbid. |
| 4 | 0.05 cc. HCl N/1 | Litmus, weak blue. | 7.0 | After 3 minutes' heating, turbid; after 6 minutes' heating, hard, white. |
| 5 | 0.2 cc. HCl N/1 | Litmus, neutral | 6.0 | After 2 minutes' heating, hard, white. |
| 6 | 1.0 cc. HCl N/1 | Litmus, weakly acid | 5.5 | After 1 minute's heating, hard, white. |
| 7 | 0.3 cc. conc. HCl | Congo, red | 5.0 | After ½ minute's heating, hard, white. |
| 8 | 1.0 cc. conc. HCl | Congo, red brown | 3.0 | After 2½ minutes' heating, clear, gelatinized. |
| 9 | 2.0 cc. conc. HCl | Congo, blue | 1.0 | After 3 minutes' heating, clear, gelatinized. |

From the condensation phenomena, turbidity in the cold, in the heat and on the hardening of the condensation product it is purely obvious that the smallest addition of acid, which produces scarcely a variation of the pH, already increases the speed of the reaction in a surprising manner. Larger proportions of acid then produce a still further acceleration which, however, is within normal limits. On the other hand, it is very surprising that even with basic catalysts the reaction is accelerated, but the proportion of base required for the purpose is not so small as in the case of acid.

Example 14

126 parts of melamine (1 mol.), 90 parts of paraformaldehyde (3 mol. formaldehyde) and 145 parts of woodmeal, together with 1½ parts of zinc stearate, are well mixed together in a ball mill and the molding powder thus obtained is pressed at 145° C. under about 200 kilos per sq. cm. for 2 minutes to form an object. The mass flows well and there is produced a hard molded object of good lustre, and showing a water-absorption, after 10 minutes sojourn in boiling water, amounting to 1.1 per cent.

In an analogous manner the methylol compounds can be worked up with woodmeal to form a molding powder, the mixture being advantageously homogenized on the hot mixing rolls. The skin thus obtained may be coarsely powdered and yields a molding powder which is not hygroscopic. Molded objects made therefrom absorb 0.5 per cent. of water when boiled for 10 minutes in water.

Example 15

252 parts of melamine (2 mols.) are heated to boiling with 850 parts by volume of neutral formaldehyde of 32 per cent. strength by volume (9 mol.) in a reflux apparatus on the open flame for 25 minutes. The solution, clear as water, thus obtained is evaporated on the water-bath at 60–70° C. in a vacuum to a syrupy condition. 385 parts of this syrup, corresponding with 260 parts of dry matter, are stirred with 90 parts of gypsum and for dilution there is added so much alcohol of 50 per cent. strength that a glue capable of being well spread is produced. 5 thin plates of wood are coated on one side and piled on one another in crossed form so that the topmost and lowest surfaces have no layer of glue. The final gluing now follows in the veneer press at a pressure of some kilos per sq. cm. and at a hardening temperature of 100° C. for 30 minutes. There is obtained a thoroughly glued ply-wood plate which proves to be completely fast to water, even boiling water.

Example 16

50 parts of nitrocellulose ("½-second-wool") are dissolved in a mixture of 10 parts of tricresylphosphate, 10 parts of butyl alcohol, 50 parts of ethylacetate and 40 parts of toluene. Into this very thick pasty solution there are stirred 100 parts of an alcoholic solution of melamine resin (see Example 8). The solution thus obtained is as clear as water and is diluted for use with a mixture of equal parts of toluene, absolute alcohol and ethylacetate. The solution is cast on glass or metal and dried, and yields a layer which is as clear as water and as smooth as a mirror and hardens when the temperature is gradually increased, and when finally a temperature of 120° C. has been applied for half-an-hour yields films of very good stability to water and of good hardness.

Example 17

Bleached cotton fabric is impregnated with the following dressing liquor:

80 parts of potato starch are stirred with cold water and, after addition of 1000 parts of water, the whole is boiled. After cooling, 10 parts of the melamine-resin solution described in Example 4 are added. The fabric is impregnated, squeezed out and dried at ordinary temperature. It is then subjected to a hardening operation for 4 minutes at 140° C. Laundry tests which have been made on fabric dressed in this manner show that the fabric, even after having been washed 4 times, still has its stiff feel, whereas this is not the case with ordinary starch dressing.

Example 18

A melamine-resin is made from 1 mol. melamine and 4½ mol. formaldehyde in the manner described in Example 2. After 30 minutes condensation the solution is evaporated in a vacuum at 60–70° C. to a syrup, whereupon it solidifies over-night to a solid jelly, which after drying for several days in the air disintegrates to a friable, glassy mass. The product is comminuted and hardened for 1 hour at 120° C. It is now insoluble in water but still soluble in acid.

2 parts of this hardened product are dissolved in 10 parts by volume of hydrochloric acid conc. at 70° C. and the solution is diluted to 400 parts by volume by means of water at 35° C. and neutralized with caustic soda solution. A fine, white dispersion is produced. In this liquor, at 35° C., there are treated 10 parts of viscose artificial silk yarn for 20 minutes, then 2 per cent. of Glauber's salt are added, calculated on the yarn, and the treatment is continued for 30 minutes. After rinsing the yarn with water it is dried. The artificial silk thus treated has a medium matt appearance which is not removed by warm soaping.

Example 19

63 parts of melamine (½ mol.) are allowed to react, while intermittently shaking, with 300 parts of neutral formaldehyde solution of 30 per cent. strength (3 mol.) in the boiling water-bath for 10 minutes. After cooling, the melamine-methylol solution thus obtained solidifies to a whitish paste.

96 parts of this paste are stirred with 100 parts by volume of hot water and warmed until a clear solution is obtained. The mixture is then cooled and made up to 190 parts by volume with water. As a softening agent there is next added a solution of 1.35 parts of the mono-carboxylic acid ester from sulfophthalic acid and cetyl-alcohol in 10 parts of water. Bleached cotton voile is impregnated in this solution at ordinary temperature, then pressed to 170 per cent. of the dry weight, dried and hardened on a metal plate during 4 minutes at 150° C. In conclusion the goods are soaped for 15 minutes at 90° C. with a solution of 5 parts of Marseilles soap and 1 part by volume of ammonia in 1000 parts of water. The fabric thus treated has a soft grip and an essentially improved creasing fastness as compared with the untreated cotton voile.

Example 20

1.1 parts of formoguanamine (2.4-diamino-1.3.5-triazine) of the formula

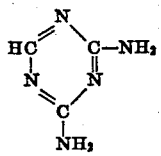

(Berichte d. d. chem. Ges., vol. 25, (1892), page 534), (0.01 mol.) and 3 parts of neutral formaldehyde of 30 per cent. strength (0.03 mol.) are heated together on a boiling water bath for 4½ hours and then cooled. There is obtained a clear solution from which a resin is precipitated by dilution with water. By spreading the solution on a support, drying and hardening it at a raised temperature there is obtained a clear, hard coating which is resistant to water.

Example 21

25.4 parts of ammelin (2-hydroxy-4.6-diamino-1.3.5-triazine) of the formula

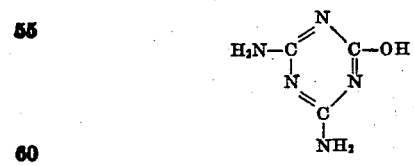

(0.2 mol.) are suspended in 188 parts by volume of formaldehyde of 32 per cent. strength by volume (2 mol.) and 8.6 parts by volume of hydrochloric acid conc. (0.1 mol.) are added. The whole is boiled for about 6 hours under reflux over the open flame. The clear solution is mixed with caustic soda solution until turbidity begins and is used to impregnate 20 parts of ground cellulose. The magma thus produced is fully neutralized by kneading with N/1 NaOH solution and the mass is dried at 70 C. in the drying chest. This product is ground and molded for 3 minutes at 145° C. under 300 kilos per sq. cm. There are obtained hard, transparent molded pieces.

Example 22

70.8 parts (0.2 mol.) of symmetrical triphenylmelamine of the formula

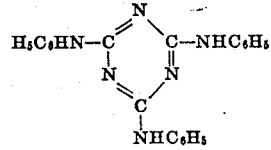

are dissolved in a reflux apparatus on the boiling water-bath together with 63.5 parts by volume of alcoholic neutral formaldehyde of 42.6 per cent. strength by volume (0.9 mol. $CH_2O$), 0.6 part by volume of concentrated sulfuric acid and 63.5 parts by volume of alcohol of 95 per cent. strength. After some minutes a clear solution is produced which after being cooled in ice-water becomes opalescent. The condensation product thus formed is neutralized with alcoholic caustic soda and then completely precipitated by addition of ice-water. It is separated from water by filtration and is dried at 60° C. in a dyeing chest. There is produced a white powder which when melted at 150–200° C. becomes a brittle, clear resin, insoluble in alcohol and benzine but soluble in benzene, toluene, acetone or the like.

Example 23

A mixture of 7.3 parts of finely pulverized 2-chloro-4.6-diamino-1.3.5-triazine (mono-chloromelamine) of the formula

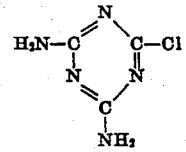

(1/20 mol.), 22 parts by volume of formaldehyde of 40.8 per cent. strength by volume (6/20 mol.), 12 parts by volume of alcohol of 95 per cent. strength and 1 part by volume of sulfuric acid of 50 per cent. strength by volume is heated to boiling in the water-bath while shaking, whereby everything is dissolved in the course of a few minutes. The solution then becomes turbid and it is therefore further boiled in a reflux apparatus on the open flame for about ½ hour until a clear solution is produced. The latter is evaporated in a vacuum, whereby a condensation product, in the form of a syrup clear as crystal, is obtained. By diluting with water, alcohol or alkali solution the product is precipitated in the form of white amorphous precipitate.

If, for example, the white precipitate obtained from 10 parts of this syrup by neutralizing it with NaOH is ground finely with 15 parts by volume of alcohol there is obtained a suspension which can be coated. If this is applied as a thin layer on veneer wood laid cross-wise and glued for half-an-hour at 100° C. under a pressure of 5–10 kilos per sq. cm. a normal veneer plate of good resistance to water is obtained.

If, for example, 15 parts of the acid chloro-melamine-resin in the form of syrup are mixed with 7 parts of wood-meal, the mixture dried at 60° C. and ground together with 0.6 part of calcium carbonate there is obtained a molding powder which, when molded at 150–160° C. under a pressure of about 300 kilos per sq. cm. yields mechanically very strong, bright brown, transparent products of good stability to water.

Example 24

6.3 parts of melamine (1/20 mol.), 15 parts by volume of alcoholic formaldehyde of 41.8 per cent. strength by volume (about 4/20 mol.), 15 parts by volume of absolute alcohol, 0.1 part by volume of concentrated hydrochloric acid (1/100 mol.) and 6 parts of the mono-glyceride of linolenic acid are caused to react with each other for 3½ hours under reflux on the boiling water-bath. There is produced a somewhat turbid, feebly yellowish, oily liquid, which, on further evaporation finally solidifies to a tough, clear, gummy mass. If, however, the oily condensation product before solidification is diluted with some benzene, preferably after addition of siccative, and applied on a support and dried in the air, there is obtained after some time a clear, transparent, hard coating which can no longer be scratched by the finger nail.

Example 25

4.7 parts of melam (Kahlbaum) of the formula

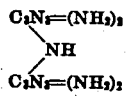

(2/100 mol.) are mixed with 20 parts by volume of formic acid and 8.5 parts by volume of an alcoholic solution of formaldehyde of 42.8 per cent. strength by volume (12/100 mol.) and 1 part by volume of sulfuric acid of 50 per cent. strength are added and the whole is heated in the oil bath at 110° C., whereby the alcohol is in greater part evaporated. After about 30 minutes an almost completely clear solution of the condensation product is formed, which rapidly becomes oily and finally gelatinous.

If the condensation solution before it gelatinizes is poured on glass and kept in an oven at 60° C. it first gelatinizes and then hardens to a hard, clear film.

If the condensation solution is mixed with alcohol, water, a solution of base or the like, a white, amorphous product is precipitated.

If the condensation solution is diluted however, for example with hot formic acid, there is obtained a solution which, according to the degree of dilution, may be completely diluted with water or, when diluted with water, yield opalescent to whitish colloidal solutions from which by salting out or neutralization the amorphous condensation product of melam is precipitated.

Example 26

37.8 parts of ground melamine (0.3 mol.), 52.8 parts of acetaldehyde (1.2 mol.) and 200 parts by volume of alcohol of 95 per cent. strength are heated to boiling in a reflux apparatus. After 1¾ hours all the melamine has dissolved. The solution is maintained boiling for a further ¾ hour and then cooled. There is obtained a clear solution which when evaporated leaves a dry brittle resin.

Example 27

25.2 parts of ground melamine (0.2 mol.) and 63.6 parts of benzaldehyde (0.6 mol.) are heated to boiling in a small flask having an air-cooled condenser which allows escape of the water formed in the reaction. After ½ hour the melamine has dissolved and a test portion withdrawn from the solution solidifies in the cold to a brittle resin which is soluble in benzyl alcohol. The reaction mixture is boiled for ½ hour longer and then cooled. There is obtained a clear resin which is still soluble in benzyl alcohol.

A quite similar resin is obtained if instead of 63.6 parts of benzaldehyde there are used 127 parts, that is twice the quantity.

Example 28

A mixture of 126 parts of melamine (1 mol.), 214 parts of an alcoholic solution of formaldehyde of 42 per cent. strength (3 mol.), 200 parts of absolute alcohol and 1 part of concentrated hydrochloric acid (about 0.01 mol.) is heated to boiling for 1 hour. The solution thus produced is neutralized with 1.3 parts of caustic soda solution of 30 per cent. strength, filtered, if desired, and kept at the boil for 3 hours; it is then cooled. There is produced a clear condensation solution which leaves a clear varnish when dried. The solution may be used alone as a varnish or in conjunction with other substances having a plasticising effect or forming varnishes which are known in the lacquer industry.

If a sample is evaporated to a constant weight on the boiling water bath in a vacuum of about 10 mm. there is produced a foamy product the weight of which is about 19 per cent. higher than that of the parent melamine and formaldehyde. Taking into consideration the formation of a few per cent. of water in the reaction it may be concluded that in this condensation product 1 mol. of melamine has been condensed with about 1 mol. of ethyl alcohol.

Example 29

A mixture of 126 parts of melamine (1 mol.) and 300 parts of neutral formaldehyde solution of 30 per cent. strength (3 mol.) is heated on the boiling water bath until a sample diluted with water yields a precipitate of resin. The solution is then evaporated to dryness in a vacuum and further treated at 100° C. for 1 hour in a vacuum.

5 parts of this product are treated at 130° C. with 8 parts of pure benzyl alcohol. A clear solution is obtained in a short time; a sample of it, however, gives a further precipitate on cooling. After a few minutes a sample remains clear on cooling but on addition of benzyl alcohol gives a precipitate. The solution continues to evolve water and formaldehyde. After ½ hour the viscosity has risen considerably. A sample when mixed cold with any desired proportion of benzyl alcohol or with a limited proportion of benzene remains clear. The whole is dried in a vacuum of about 0.07 mm. of mercury at 100° C. until the weight is constant, whereby there is obtained a product which is glass-clear and of foamy structure: its weight is now about 28 per cent. higher than that of the quantity of melamine formaldehyde condensation product used.

By further condensation at 130° C. the condensate after about ¾ hour becomes highly viscous and has a tendency to gelatinize. A sample of this product dried at 100° C. in a vacuum under a pressure up to 0.04 mm. of mercury until the weight is constant and finally in the form of powder shows an increase of weight of 38 per cent. For 1 mol. melamine, therefore, approximately ¾ mol. benzyl alcohol has been condensed in the new product.

Example 30

126 parts of melamine (1 mol.) are dissolved in 650 parts of a neutral solution of formaldehyde of 30 per cent. strength (6.5 mol.) heated to 90° C.; the solution is kept at 90° C. for 5 minutes and then cooled. When the temperature has fallen to 60° C. 600 parts of alcohol are added and the cooling is continued. The white mass which has separated is filtered, washed with aqueous alcohol of 50 per cent. strength and dried. The product consists in greater part of hexamethylolmelamine $C_3N_6(CH_2OH)_6.H_2O$.

100 parts of this product are dissolved in 200 parts by volume of methanol under addition of 5 parts by volume of a N/1 solution of hydrochloric acid in methanol at boiling temperature. The solution is kept boiling for some hours and then evaporated in vacuo. A clear resin is obtained which may be used for instance as a lacquer or lacquer substitute.

From the determination of the methoxy content according to the method of Zeisel it results that the resin has chemically bound 3 moles of methanol for each mol. of melamine.

Example 31

324 parts of the hexamethylol melamine made according to Example 30, paragraph 1 (1 mol.) are treated on the boiling water bath whilst stirring with a solution of 10 parts of hydrochloric acid (0.1 mol.), 200 parts of ethyl alcohol and 1400 parts of ethyl-2-hexanol. After 20 minutes a slightly turbid solution is produced. After 1 hour, the whole is cooled. The product consists of two layers; 500 parts of it are distilled in a vacuum on the boiling water bath whereby a homogeneous solution is produced. This is filtered if necessary and then evaporated in a vacuum to a thick syrup. This syrup is soluble in benzene and benzine and any other solvents.

Example 32

120 parts of para-formaldehyde (4 mol.) are dissolved in 1200 parts of allyl alcohol with the aid of heat and 126 parts of melamine (1 mol.) are added. The mixture is heated to boiling. In a few minutes a clear solution is produced and this is maintained for 4 hours at the boil and then evaporated at 100° C. first in a vacuum of 10 mm. and then in a vacuum of about 0.1 mm. until all odour has disappeared. There is obtained a fusible resin which is viscous at 100° C. and solidifies when cold. At 150° C. it gradually hardens.

Example 33

126 parts of finely ground melamine (1 mol.), 450 parts of an alcoholic solution of formaldehyde of 40 per cent. strength (6 mol.) and 1 part of concentrated hydrochloric acid (0.01 mol.) are together heated in the boiling water bath for 10–15 minutes until all is dissolved. There are then added 100 parts of cetyl alcohol and the whole is treated in the boiling water bath for 1 to 1½ hours and then cooled. Instead of cetyl alcohol, lauryl alcohol, stearyl alcohol, oleyl alcohol, terpineol, alcohols of wool fat, castor oil, tartaric acid diethyl ester, diethyline (glycerol-diethyl ether), glycerolmonochlorhydrin, cyclohexanone-glycerol ($O^a.O^\beta$-cyclohexylidene - glycerol) or the like may be used. In all cases a clear solution is produced which on cooling either remains clear or becomes a white viscous liquid or paste. Independently of this appearance all the products are glass-clear when they are dissolved in acetone or when the volatile solvent has been evaporated.

Example 34

126 parts of melamine (1 mol.) are condensed with 300 parts of neutral formaldehyde solution of 30 per cent. strength (3 mol.) until a cooled sample of the clear solution yields a precipitate of resin when diluted with water. 100 parts of glycerol are now added and the mixture distilled in the boiling water bath in a vacuum of 12 mm. The internal temperature gradually rises to 92° C. The distillation of water has then practically ceased, but the product is still treated for 2 hours in a vacuum of about 12 mm. and then for 1 hour in a vacuum of about 3–4 mm. in the boiling water bath. The clear mass is cast into a mould and hardened for 20 hours at 110° C. There is produced a clear, very hard and mechanically good casting.

Instead of glycerol another alcohol may be used, for instance glycol.

Example 35

126 parts of melamine (1 mol.) are dissolved in the boiling water bath in 200 parts of neutralised formaldehyde solution of 30 per cent. strength (2 mol.) and are kept in the water bath until a cooled sample yields a precipitate of resin immediately on mixing with an equal quantity of water. 70 parts of water are then distilled in a vacuum and the mass mixed with 55 parts of glycerol, 110 parts of wood flour and a colouring matter and then kneaded on hot rollers until a skin is produced. The latter is comminuted. The product thus obtained may be moulded in a hot press, for example at 145° C., for 3 minutes to produce a good hard molding which after 24 hours' immersion in cold water increases 1 per cent. in weight and after 10 minutes' immersion in boiling water increases 1.5 per cent. in weight.

Example 36

126 parts of finely ground melamine (1 mol.), 450 parts of an alcoholic solution of formaldehyde of 40 per cent. strength (6 mol.) and alcoholic hydrochloric acid (0.01 mol.) are treated together in the boiling water bath until all has dissolved. The solution is now mixed with 0.01 mol. of alcoholic caustic soda (solution A).

(a) The solution A is mixed with 372 parts of ricinoleic acid mono-glyceride (1 mol.) and 200 parts of absolute alcohol. There is produced a clear solution which is kept for 5 hours at the boil. The product thus obtained is poured on to a support and dried in the oven; there is produced a clear soft film.

(b) 148 parts of phthalic anhydride (1 mol.) and 92 parts of glycerol (1 mol.) are kept together at 160° C. for 22 hours. There is produced a resin having an acid number of 70. This resin is mixed with the solution A, 200 parts of benzene and 200 parts of absolute alcohol and the whole is kept at the boil for 5 hours. There is produced a clear solution which may be used as a varnish.

(c) 92 parts of glycerol (1 mol.), 148 parts of phthalic anhydride and 200 parts of absolute alcohol are dissolved in solution A and the solution thus obtained is treated in the form of a thin layer in the oven. There is obtained in this manner a very hard lacquer.

Example 37

146 parts of adipic acid (1 mol.) and 101.2 parts of glycerol (1.1 mol.) are heated together first for 1 hour at 155–160° C. and then within 1½ hours gradually to 230° C. until the limit of gelatinization has been attained and the acid number is 30.7 whereupon the whole is immediately cooled and dissolved in a mixture of 100 parts each of absolute alcohol and benzene.

63 parts of melamine (0.5 mol.) are boiled together with 225 parts of alcoholic formaldehyde solution of 40 per cent. strength (3 mol.) until an almost clear solution is produced.

These two solutions are mixed and the mixture is boiled for 12 hours. The solution thus obtained dries on a support to a dazzling clear lacquer.

Example 38

126 parts of melamine (1 mol.), 126 parts of mannitol and 500 parts of commercial formaldehyde solution of 36 per cent. strength (6 mol.) are condensed together for 1½ hours at 70° C. and then evaporated in a vacuum to dryness. The product thus obtained is moulded for 6 minutes in the hot press at 150° C., whereby transparent mouldings are produced which, when immersed in cold water for 24 hours increase in weight by 1 per cent. and when treated for 10 minutes in boiling water increase in weight by 1.8 per cent.

Example 39

126 parts of melamine (1 mol.), 126 parts of cane sugar and 600 parts of neutral formaldehyde solution of 30 per cent. strength (6 mol.) are heated together in the boiling water bath until a sample of the clear solution diluted with water yields a true separation of resin. The condensation solution is then dried in a vacuum to a product of foamy structure which is comminuted and after-treated at 100° C. until a fluidity favourable for moulding in the hot press has been obtained. If this product is moulded for 6 minutes at 145° C. there is produced a hard glass-clear moulding which when stored in water for 24 hours increases in weight by 0.1 per cent. and when boiled in water for 10 minutes increases in weight by 2.3 per cent.

If, instead of sugar, trihexosane (compare Helv. Chim. Acta, vol. 5, page 642, 1922) or soluble starch is used and the procedure is analogous there is obtained a moulding which is also glass-clear; this increases in weight after immersion for 24 hours in water 0.4 per cent. or 0.5 per cent. and when treated for 10 minutes in boiling water 0.6 per cent. or 2.6 per cent. By subsequently storing the moulding thus treated with water the new weight changes a little. The weight, however, is never below the original weight.

Example 40

126 parts of melamine (1 mol.), 126 parts of trihexosane and 600 parts of neutral formaldehyde solution of 30 per cent. strength (6 mol.) are treated for 40 minutes in the boiling water bath. The condensation product thus obtained is then brought to dryness in a vacuum. The dry product is soluble to a clear solution in a limited quantity of cold water.

100 parts are mixed with 6 parts of ammonium sulfate and the mixture is dissolved in 50 parts of water. Canadian birch veneers of 2 mm. thickness are painted with the solution and laminated in the usual manner to a three-ply wood which is then pressed for 12 minutes under a pressure of at least 4 kilos per sq. c., at 100° C. The gluing is stable to boiling water and of high strength.

Example 41

252 parts of melamine (2 mol.), 400 parts of commercial formaldehyde of 30 per cent. strength (4 mol.) and 370 parts of cane sugar are heated together on the water bath for ¼ hour. When a sample yields a precipitate of resin on dilution with water a condensation solution is kneaded with 270 parts of cellulose and the mixture is dried and ground. The powder thus obtained is moulded, for example for 2 minutes at 175° C., whereby mouldings are produced which, when stored in cold water increase in weight by 4 per cent. and when treated for 10 minutes in boiling water increase in weight by 2.2 per cent.

Example 42

12.6 parts of melamine (0.1 mol.), 60 parts of glucose (0.33 mol.), 160 parts of water and 10 parts of n-hydrochloric acid (0.01 mol.) are heated together to boiling for 4 hours. A turbid solution is produced which yields flocculent and granular precipitates on cooling. The whole is mixed with 60 parts of formaldehyde solution of 30 per cent. strength (0.6 mol.) and the mixture is heated for 2 hours to boiling. There is produced a quite clear solution which solidifies to a clear highly viscous mass on cooling. It may be diluted with water to form a feebly opalescent solution. The addition of alkali lye produces a precipitation.

This product may be used, for example, as a thickening agent in various branches of industry, for example in textile chemistry.

Example 43

126 parts of melamine (1 mol.), and 131 parts of paraformaldehyde (4.4 mol.) are dissolved together in 1250 parts of fused chloralhydrate and the solution is kept at the boil for about 2 hours until it has become viscous. The product is now treated in a vacuum of about 10 mm. in the boiling water bath until it is hard and capable of being powdered. 1 part of the powder is further treated at 100° C. in a vacuum of 0.1 mm. After 10 hours diminution of weight has practically ceased and the odour of chloral has almost completely disappeared. Having regard to the total weight the final product obtained in this manner amounts to about 500 parts. The product contains, therefore, chloral to an amount which is two-fold that of the melamine.

Example 44

126 parts of finely pulverized melamine (1 mol.), 450 parts of alcoholic formaldehyde solution of 40 per cent. strength (6 mol.), and 0.01 mol. of alcoholic hydrochloric acid are together heated in the boiling water bath until all has dissolved. 120 parts of urea (2 mol.) are now added and the mass further treated in the boiling water bath for about ½ hour. The solution thus obtained is viscous when cold. It may be diluted with alcohol and may be used as a varnish.

Example 45

126 parts of melamine (1 mol.), 180 parts of para-formaldehyde (6 mol.) and 660 parts of glycerol chlorhydrin are together kept at 90° C. for 3 hours. The clear solution is then mixed with 3000 parts of water and thoroughly stirred. There separates a resin of silky lustre. The mixture is then cooled with ice while kneading. In this manner the resin acquires a tough consistency. The supernatant, nearly clear water is poured off and the resin is kneaded with 500 parts of water for the purpose of further washing it. The resin separated from the washing water is now dried in a vacuum at a moderate temperature and then dissolved in 900 parts of glycolmonomethyl ether. The clear solution A thus obtained contains about 30 per cent. of resin and the resin itself contains about 11 per cent. of chlorine. There is therefore more than 1 mol. of glycerol chlorhydrin present in the resin per mol. of melamine.

1300 parts of solution A (containing about 1 mol. of melamine) and 320 parts of dry potassium linoleate (1 mol.) dissolved in 320 parts of glycol monomethyl ether are mixed together and the mixture is heated to boiling. After 2½ hours, as will be apparent from the quantity of potassium chloride which has separated, the larger part of the potassium soap has been decomposed. The mixture is kept at the boil for 9 hours. After this time the reaction is practically complete. The clear solution thus obtained is separated from the deposited potassium chloride and may be used as a varnish.

*Example 46*

202 parts of 2:4-diamino-6-phenylamino-1:3:5-triazine (1 mol.) and 318 parts of benzaldehyde (3 mol.) are dissolved in 250 parts of boiling butanol and the solution is kept at 100° C. for 1½ hours. There is produced a solution which remains clear in the cold and solidifies in the oven to a hard clear varnish.

*Example 47*

278 parts of 2-amino-4:6-diphenylamino-1:3:5-triazine (1 mol.), 300 parts of an alcoholic solution of formaldehyde of 40 per cent. strength (4 mol.) and 300 parts of absolute alcohol are kept at the boil for 1-2 hours. There is produced a clear solution which, when dried, leaves a clear varnish.

*Example 48*

200 parts of 2-amino-4-hydroxy-6-phenyl-1:3:5-triazine (1 mol.) and 90 parts of paraformaldehyde (3 mol.) are mixed with 600 parts of glycol. The mixture is first kept at the boil for about 10 minutes until a clear solution is produced; the latter is then treated for ½ hour at 150° C. There is produced a solution which remains clear in the cold.

*Example 49*

163 parts of 3-amino-1:2:4-phentriazoxine (1 mol.), 300 parts of formaldehyde solution of 30 per cent. strength (3 mol.), 100 parts of n-hydrochloric acid (0.1 mol.) and 1000 parts of water are together heated in the water bath. After few minutes resinous clumps form in the mixture. The whole is treated while kneading for another ¼ hour in the water bath and then cooled. The solidified resin is comminuted, filtered, washed and dried.

1 part of this resin is dissolved together with 0.6 part of glycol in 50 parts of ethyl-2-butanol with aid of heat. On cooling the resin precipitates again. The mixture is now kept at the boil for 8 hours. After this treatment precipitation does not take place on cooling. The solution is clear and on evaporation leaves a resin which is hard and clear when cold.

What we claim is:

1. A process for the manufacture of condensation products characterized by condensing an aldehyde with a compound containing at least one alcoholic hydroxy group and a triazine of the formula

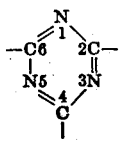

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

2. A process for the manufacture of condensation products characterized by condensing formaldehyde, a compound containing at least one alcoholic hydroxy group and 2.4.6-triamino-1.3.5-triazine (melamine) of the formula

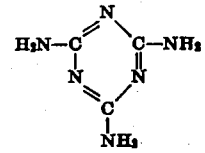

3. A process for the manufacture of condensation products characterized by condensing an aldehyde, a monoalcohol and a triazine of the formula

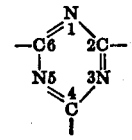

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

4. A process for the manufacture of condensation products characterized by condensing an aldehyde, a polyalcohol and a triazine of the formula

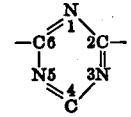

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

5. A process for the manufacture of condensation products characterized by condensing an aldehyde, a carbohydrate and a triazine of the formula

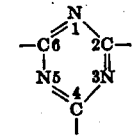

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

6. A process for the manufacture of condensation products characterized by condensing an aldehyde, a compound containing at least one alcoholic hydroxy group and a triazine of the formula

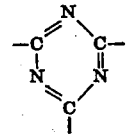

wherein at least one of the free valencies is substituted by an amino group having at least one reactive hydrogen atom, the remaining free valencies being taken up by a radical selected from the group consisting of hydrogen, hydroxyl, halogen, alkyl, alkylene, aryl and aralkyl, up to the formation of a resin.

7. A process according to claim 6 wherein the condensation products are hardened.

8. The new condensation products obtained by interaction between an aldehyde, a compound containing at least one alcoholic hydroxy group and a triazine of the formula

wherein at least one of the free valencies is substituted by an amino group having at least one reactive hydrogen atom, the remaining free valencies being taken up by a radical selected from the group consisting of hydrogen, hydroxyl, halogen, alkyl, alkylene, aryl and aralkyl.

9. The new condensation products obtained by interaction between formaldehyde, a compound containing at least one alcoholic hydroxy group, and 2.4.6-triamino-1.3.5-triazine (melamine) of the formula

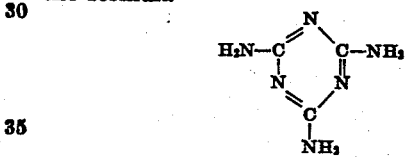

10. The new condensation products obtained by interaction between an aldehyde, a monoalcohol and a triazine of the formula

wherein at least one of the free valencies is substituted by an amino group having at least one reactive hydrogen atom, the remaining free valencies being taken up by a radical selected from the group consisting of hydrogen, hydroxyl, halogen, alkyl, alkylene, aryl and aralkyl.

11. The new condensation products obtained by interaction between an aldehyde, a polyalcohol and a triazine of the formula

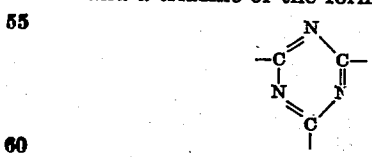

wherein at least one of the free valencies is substituted by an amino group having at least one reactive hydrogen atom, the remaining free valencies being taken up by a radical selected from the group consisting of hydrogen, hydroxyl, halogen, alkyl, alkylene, aryl and aralkyl.

12. The new condensation products obtained by interaction between an aldehyde, a carbohydrate and a triazine of the formula

wherein at least one of the free valencies is substituted by an amino group having at least one reactive hydrogen atom, the remaining free valencies being taken up by a radical selected from the group consisting of hydrogen, hydroxyl, halogen, alkyl, alkylene, aryl and aralkyl.

13. A process for the manufacture of condensation products characterized by the interaction of an aldehyde, a compound containing at least an alcoholic group and a triazine bearing attached to at least one of the three carbon atoms of the nucleus an amino-group having at least one reactive hydrogen atom.

14. The new condensation products obtained by the interaction of an aldehyde, a compound containing at least an alcoholic group and a triazine bearing attached to at least one of the three carbon atoms of the nucleus an amino-group having at least one reactive hydrogen atom.

15. A process for the manufacture of condensation products characterized by condensing an aldehyde, a saccharide and a triazine of the formula

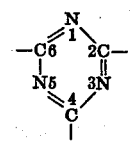

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

16. A process for the manufacture of condensation products characterized by condensing an aldehyde, a resin compound of the type of an alkyd resin containing free hydroxyl groups, and a triazine of the formula

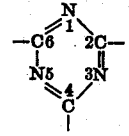

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

17. A process for the manufacture of condensation products characterized by condensing an aldehyde, glycerol phthalic anhydride resin containing free hydroxyl groups, and a triazine of the formula

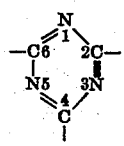

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

18. A process for the manufacture of condensation products characterized by condensing an aldehyde, glycerol adipic acid resin containing free hydroxyl groups, and a triazine of the formula

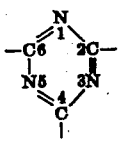

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

19. The new condensation products obtained by interaction between an aldehyde, a saccharide and a triazine of the formula

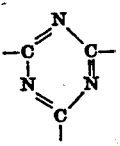

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

20. The new condensation products obtained by interaction between an aldehyde, resin compound of the type of an alkyd resin containing free hydroxyl groups, and a triazine of the formula

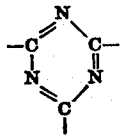

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

21. The new condensation products obtained by interaction between an aldehyde, glycerol phthalic anhydride resin containing free hydroxyl groups, and a triazine of the formula

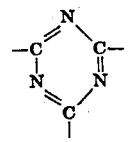

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

22. The new condensation products obtained by interaction between an aldehyde, glycerol adipic acid resin containing free hydroxyl groups, and a triazine of the formula

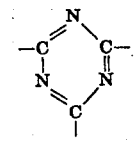

wherein at least one of the free valencies of the nucleus is substituted by an amino group having at least one reactive hydrogen atom, the remaining free valencies being taken up by a radical selected from the group consisting of hydrogen, hydroxyl, halogen, alkyl, alkylene, aryl and aralkyl.

GUSTAVE WIDMER.
WILLI FISCH.